United States Patent
Black

(10) Patent No.: US 8,087,871 B2
(45) Date of Patent: Jan. 3, 2012

(54) TURBOMACHINE COMPRESSOR WHEEL MEMBER

(75) Inventor: Kenneth Damon Black, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 12/473,352

(22) Filed: May 28, 2009

(65) Prior Publication Data

US 2010/0303606 A1    Dec. 2, 2010

(51) Int. Cl.
*F01D 5/08* (2006.01)
(52) U.S. Cl. ............................ 415/1; 415/115
(58) Field of Classification Search ............... 415/115, 415/116, 1
See application file for complete search history.

(56) References Cited

U.S. PATENT DOCUMENTS

| | | | | |
|---|---|---|---|---|
| 2,858,101 A | * | 10/1958 | Alford | 416/97 R |
| 3,356,340 A | * | 12/1967 | Bobo | 415/115 |
| 3,897,168 A | | 7/1975 | Amos | |
| 5,020,970 A | | 6/1991 | Dussourd et al. | |
| 5,054,996 A | * | 10/1991 | Carreno | 415/115 |
| 6,022,190 A | * | 2/2000 | Schillinger | 416/96 R |
| 6,102,654 A | * | 8/2000 | Oeynhausen et al. | 415/115 |
| 6,185,924 B1 | | 2/2001 | Matsumoto et al. | |
| 6,438,941 B1 | | 8/2002 | Elliott et al. | |
| 6,574,965 B1 | | 6/2003 | Feulner | |
| 6,808,362 B1 | * | 10/2004 | Glahn et al. | 415/115 |
| 7,017,349 B2 | | 3/2006 | Laurello et al. | |
| 7,114,915 B2 | * | 10/2006 | Uematsu et al. | 415/115 |
| 7,131,813 B2 | * | 11/2006 | Tiemann | 415/115 |

FOREIGN PATENT DOCUMENTS

| | | |
|---|---|---|
| EP | 0909878 | 4/1999 |
| EP | 1013937 | 6/2000 |

* cited by examiner

*Primary Examiner* — Edward Look
*Assistant Examiner* — Liam McDowell
(74) *Attorney, Agent, or Firm* — Cantor Colburn LLP

(57) ABSTRACT

A turbomachine includes a rotor assembly including a wheel member. The wheel member includes a first portion that extends to a second portion through an intermediate portion. The intermediate portion partially defines a first wheel space and a second wheel space. The wheel member further includes a rotor inertia belt member arranged at the second portion. The rotor inertia belt member includes an extraction air cavity. The extraction air cavity includes an inlet, a first plurality of extraction air passages each including an inlet section and an outlet section, the outlet section leading into the first wheel space, and a second plurality of extraction air passages each including an inlet portion and an outlet portion, the outlet portion leading into the second wheel space.

15 Claims, 3 Drawing Sheets

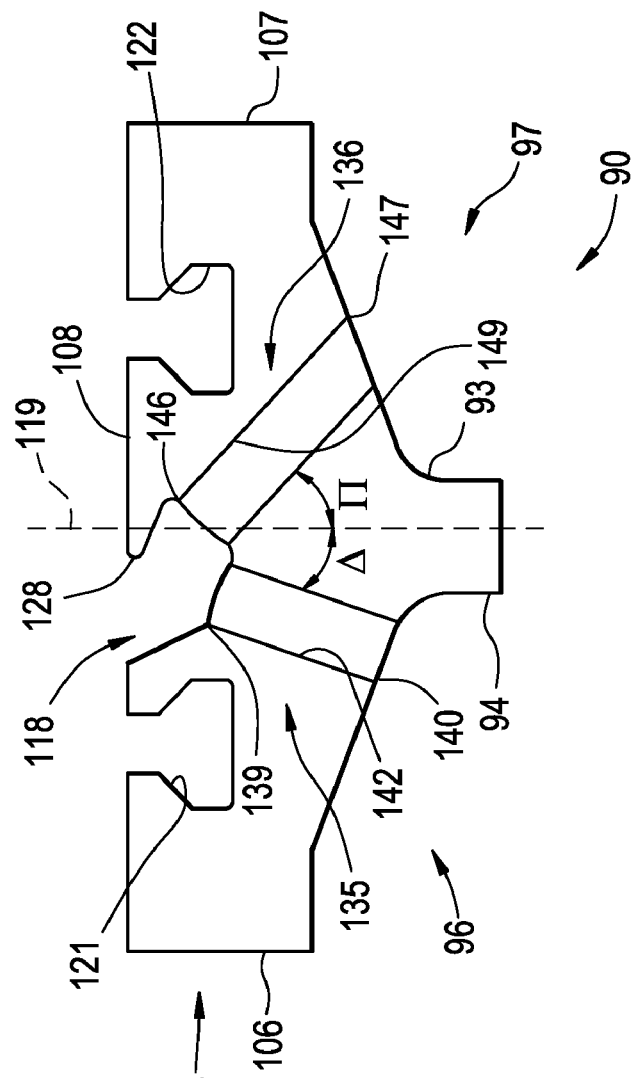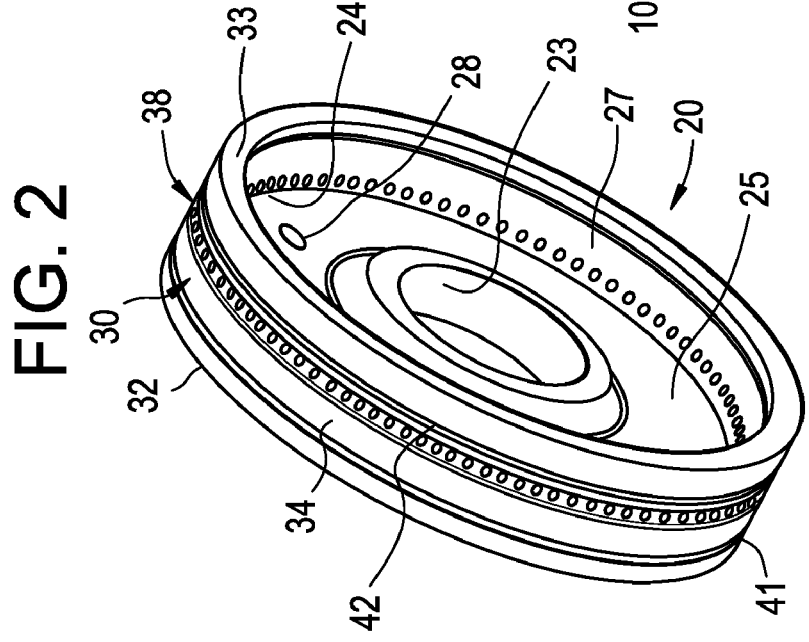

TURBOMACHINE COMPRESSOR WHEEL MEMBER

BACKGROUND OF THE INVENTION

The subject matter disclosed herein relates to the art of turbomachines and, more particularly, to a turbomachine compressor wheel member.

In conventional turbomachines, air is extracted from a compressor to cool hotter components such as, for example, turbine blades and nozzles. The air is generally extracted from a point as close as possible to an inlet of the compressor while still maintaining a sufficient backflow margin between source and sink pressure. As the axial position of the extraction is moved aft, turbomachine efficiency drops. That is, the further aft the extraction, the more work is put into the extraction air. As this work is not utilized, the overall efficiency of the turbomachine is lowered.

In certain cases, it is desirable to extract the air radially inwardly, toward a centerline of the rotor rather than radially outwardly thru the stator casing. When extracting air radially inward, the air must pass an inertia belt portion of the rotor. The inertia belt is an area of the cross-section of the rotor that impacts the ability to support sag due to gravity and internal axial stresses. In order to increase extraction airflow, the size of the extraction point must be enlarged. Enlarging the size of the extraction point requires the removal of additional material from the circumference of the rotor. This loss of material decreases the inertia belt, which, in turn, increases gravity sag and stresses. Towards that end, there is a limit to how much air can be extracted before the structural integrity of the rotor is compromised. One method for increasing the flow area is to have two or more arrays of axially spaced holes rather than one array of holes. However, this arrangement increases manufacturing costs of both the rotor and the stator.

BRIEF DESCRIPTION OF THE INVENTION

According to one aspect of the invention, a turbomachine includes a rotor assembly having at least one wheel member. The at least one wheel member includes a first portion that extends to a second portion through an intermediate portion. The intermediate portion partially defines a first wheel space and a second wheel space. The at least one wheel member further includes a rotor inertia belt member arranged at the second portion. The rotor inertia belt member includes an extraction air cavity. The extraction air cavity includes an inlet, a first plurality of extraction air passages each including an inlet section and an outlet section, the inlet section being fluidly connected to the inlet and the outlet section leading into the first wheel space, and a second plurality of extraction air passages each including an inlet portion and an outlet portion, the inlet portion being fluidly connected to the inlet and the outlet portion leading into the second wheel space.

According to another aspect of the invention, a method of extracting air from a turbomachine includes guiding an air flow into an extraction air cavity formed in a rotor inertia belt member, passing a first portion of the air flow through a first plurality of extraction air passages formed in the rotor inertial belt member. The first plurality of extraction air passages extend between the extraction air cavity and a first wheel space. The method further includes passing a second portion of the airflow through a second plurality of extraction air passages formed in the rotor inertia belt member. The second plurality of extraction air passages extend between the extraction air cavity and a second wheel space.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a lower left perspective view of one of the plurality of compressor wheel members of FIG. 1;

FIG. 4 is a partial cross-sectional view of a compressor wheel member constructed in accordance with another exemplary embodiment.

The detailed description explains embodiments of the invention, together with advantages and features, by way of example with reference to the drawings.

DETAILED DESCRIPTION OF THE INVENTION

Figure 1:
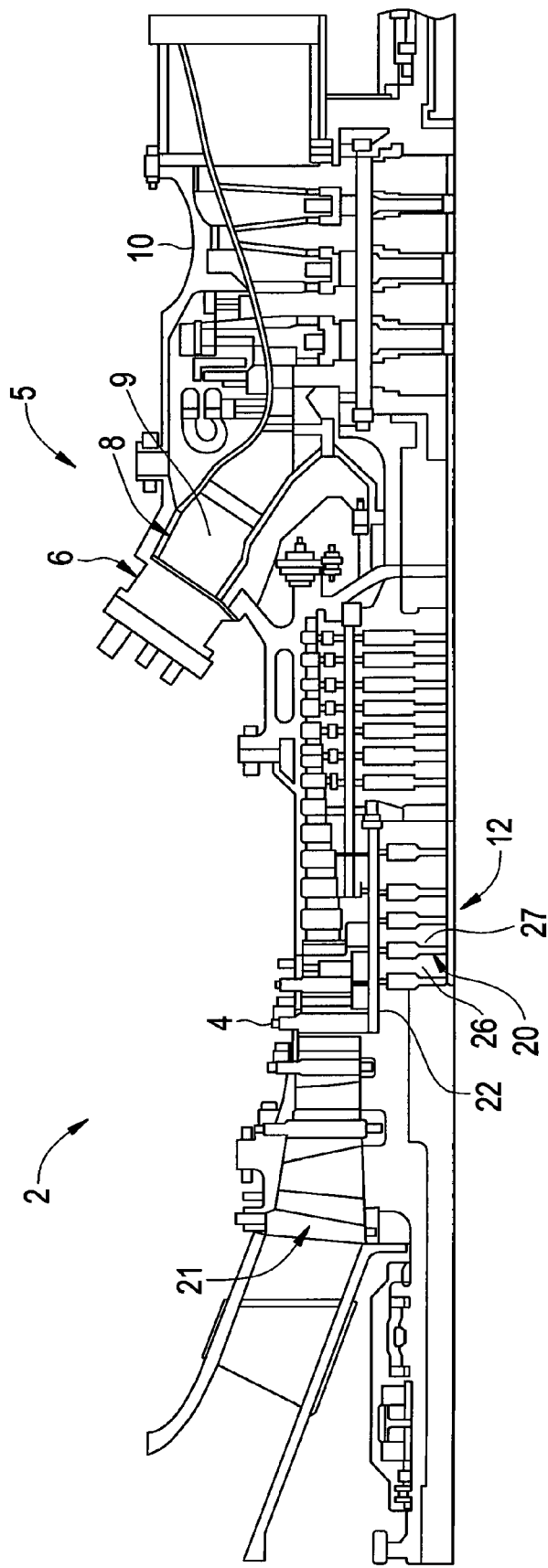
FIG. 1 is a partial cross-sectional view of a turbomachine including a plurality of compressor wheel member in accordance with an exemplary embodiment.

With reference to FIG. 1, a turbomachine constructed in accordance with exemplary embodiments of the invention is generally indicated at 2. Turbomachine 2 includes a compressor 4 and a combustor assembly 5 having at least one combustor 6 provided with an injection nozzle assembly housing 8 and a combustion chamber 9 that leads to a turbine 10. Turbomachine 2 also includes a rotor assembly 12 including a plurality of rotors or wheel members, one of which is indicated at 20 arranged along an airflow path 21. In the exemplary embodiment shown, wheel members 20 are linked by at least one axial bolt 22. Of course it should be understood that wheel members 20 could also be linked by a welding process or other component joining techniques. The wheel members define various stages (not separately labeled) of compressor 4.

During operation, air flows through compressor 4, is compressed, and passed to combustor 6. At the same time, fuel is passed to combustor 6 to mix with the compressed air to form a combustible mixture. The combustible mixture is channeled to combustion chamber 9 and ignited to form combustion gases. The combustion gases are then channeled to turbine 10. Thermal energy from the combustion gases is converted to mechanical rotational energy that is employed to rotor assembly 12. The above description was provided for the sake of completeness and to enable a more clear understanding of the exemplary embodiments which are directed to the particular structure and operation of wheel member 20.

Figure 3:
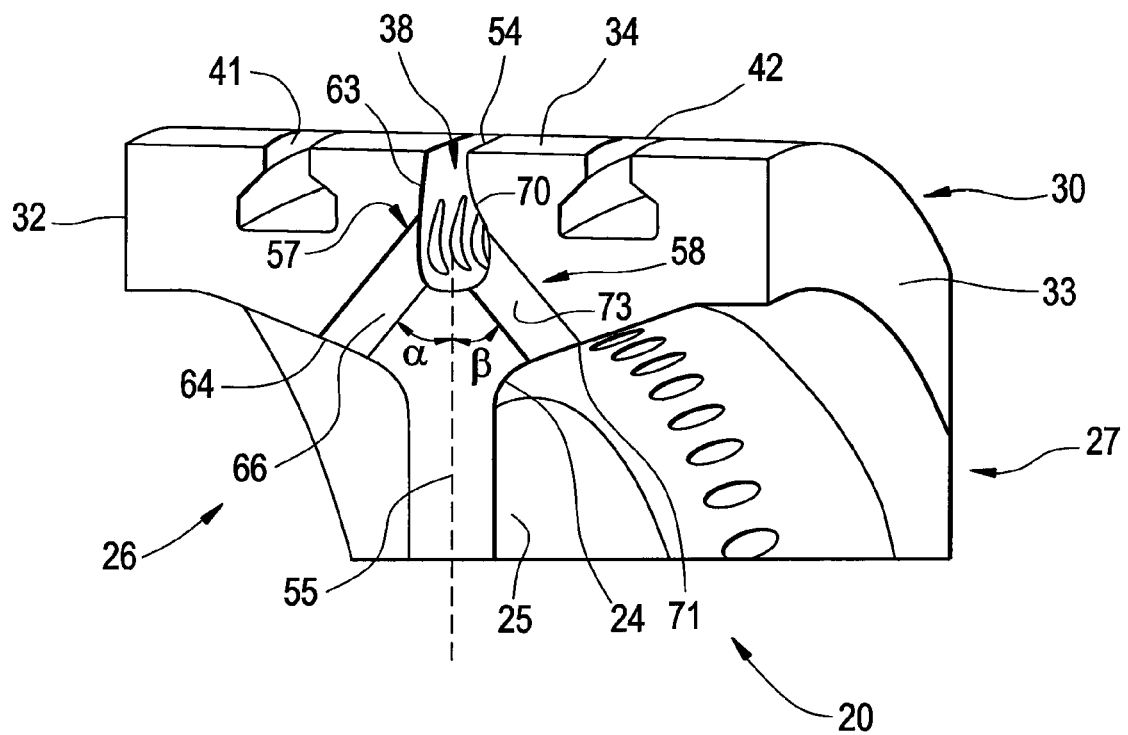
FIG. 3 is a partial cross-sectional view of the compressor wheel member of FIG. 2.

As best shown in FIGS. 2-3, wheel member 20 includes a first portion 23 that extends to a second portion 24 through an intermediate portion 25. First portion 23 defines a hub (not separately labeled) that provides an interface between wheel member 20 to compressor/turbine shaft 12. Intermediate portion 25 defines, in part, a first wheel space 26 and a second wheel space 27. More specifically, compressor 4 includes a plurality of wheel space areas arranged between adjacent ones of the plurality of wheel members 20. In addition, wheel member 20 includes a passage 28 provided in intermediate portion 25. Passage 28 fluidly connected wheel space 26 with wheel space 27.

Wheel member 20 is also shown to include a rotor inertia belt member 30 arranged at second portion 24. Rotor inertia belt member 30 includes a first diametric section 32 that extends to a second diametric section 33 through a central section 34. Rotor inertia belt member 30 further includes an extraction air cavity 38 arranged in central section 34. In addition, rotor inertia belt member 30 includes a first groove/channel 41 and a second groove/channel 42 arranged on either side of extraction air cavity 38. Each groove/channel 41, 42 is configured to receive a compressor blade (not separately labeled).

As best shown in FIG. 3, extraction air cavity 38 includes an inlet 54 arranged along a central lateral plane 55 of rotor inertia belt member 30. Inlet 54 leads to a first plurality of extraction air passages 57 that extend between extraction air cavity 38 and wheel space 26, and a second plurality of extraction air passages 58 that extend between extraction air cavity 38 and wheel space 27. Each of the first plurality of extraction air passages 57 includes an inlet section 63 that extends to an outlet section 64 through a conduit section 66. Conduit section 66 is arranged at a first angle, $\alpha$, relative to central lateral plane 55. Similarly, each of the second plurality of extraction air passages 58 includes an inlet portion 70 that extends to an outlet portion 71 through a conduit portion 73. Conduit portion 73 is arranged at a second angle, $\beta$, relative to central lateral plane 55. In the exemplary embodiment shown, first angle $\alpha$ and second angle $\beta$ are substantially equal.

With this arrangement, extraction air flowing into extraction air cavity 38 passes through inlet 54 to the first and second pluralities of extraction air passages 57 and 58. The air flow diverges into each inlet section 63 and inlet portion 70 and flows through each conduit section 66 and each conduit portion section 73 toward first and second wheel spaces 26 and 27 respectively. By arranging the first and second pluralities of extraction air passages away from airflow path 21 and moving the rotor inertia belt radially inward, overall extraction airflow is increased without requiring a corresponding increase in size of wheel member 20. In addition, the presence of passage 28 enables the extraction air to flow freely between adjacent wheel spaces. In this manner, the exemplary embodiment privies a system for increasing extraction area, which provides an increased volume of extraction air, that passes radially inward of compressor 4. Moreover, the increase in extraction air volume does not come at the expense of the structural integrity of wheel member 20. In addition, the exemplary embodiment does not present more than a small impact on rotor length. In any event, the increase in area reduces efficiency losses within compressor 4 associated with high mach numbers and allows for lower source pressures and/or flows to be employed.

Reference will now be made to FIG. 4 in describing a wheel member 90 constructed in accordance with another exemplary embodiment. As shown, wheel member 90 includes a first portion (not shown) that extends to a second portion 93 through an intermediate portion 94. In a manner similar to that described above, intermediate portion 94 can be provided with a passage (not shown). In a manner also similar to that described above, intermediate portion 94 defines, at least in part, a first wheel space 96 and a second wheel space 97. Wheel member 90 further includes a rotor inertia belt member 104 having a first diametric section 106 that extends to a second diametric section 107 through a central section 108. Rotor inertia belt member 104 includes an extraction air cavity 118 formed in central section 108. In the exemplary embodiment shown, extraction air cavity 118 is off-set from a central lateral plane 119 of rotor inertia belt member 104. As also shown, rotor inertia belt member 104 includes a first groove/channel 121 and a second groove/channel 122. First and second groove/channels define mounting points for compressor blades (not separately shown).

In further accordance with the exemplary embodiment shown, extraction air cavity 118 includes an inlet 128 off-set from central lateral plane 119 of central section 108. Inlet 128 leads to a first plurality of extraction air passages 135 that extend between extraction air cavity 118 and first wheel space 96, and a second plurality of extraction air passages 136 that extend between extraction air cavity 118 and second wheel space 97. As shown, each of the first plurality of extraction air passages 135 includes an inlet section 139 that extends to an outlet section 140 through a conduit section 142. Conduit section 142 extends at a first angle, $\Delta$, relative to central lateral plane 119. Similarly, each of the second plurality of extraction air passages 136 includes an inlet portion 146 that extends to an outlet portion 147 through a conduit portion 149 that is arranged at a second angle, $\pi$, relative to central axis 119. As shown, first angle $\Delta$ is smaller than second angle $\pi$ such that the first plurality of extracted air passages 135 are asymmetric relative to the second plurality of extracted air passages 136.

The asymmetry formed with extracted air cavity 118, inlet 128 and the extraction air passages 135 and 136 allows for free vortexing of the extraction flow radial inward of wheel member 90 thereby decreasing pressure losses. In addition, by providing first and second pluralities of extraction air passages, extraction airflow is increased into first and second wheel spaces 96 and 97. Finally, the particular location and orientation of the extraction air passages enables wheel member 90 to be constructed so as to reduce removal of material from intermediate portion 94 thereby reducing impact on gravity sag and associated stresses.

At this point, it should be understood that the present invention provides for a system to increase extraction airflow within a compressor without impacting overall size or durability of compressor wheel members. In addition, by creating an asymmetry between extraction air passages, pressure losses within the wheel space area of compressor 4 are reduced thereby enhancing overall compressor efficiency. In addition, it should be understood that the exemplary embodiments are not limited to inclusion into one type of turbomachine and can be employed in a wide range of turbomachine models.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbomachine comprising:
   a rotor assembly including at least one wheel member having:
   a first portion, that extends to a second portion through an intermediate portion, the intermediate portion partially defining a first wheel space and a second wheel space; and
   a rotor inertia belt member arranged at the intermediate portion of the at least one wheel member, the rotor inertia belt member including an extraction air cavity having an inlet, a first plurality of extraction air passages each including an inlet section and an outlet section, the inlet section being fluidly connected to the inlet and the outlet section leading into the first wheel space, and a second plurality of extraction air passages each including an inlet portion and an outlet portion, the inlet portion being fluidly connected to the inlet and the outlet portion leading into the second wheel space, wherein the first wheel space is distinct from the second wheel space.

2. The turbomachine according to claim 1, wherein the rotor inertia belt member includes a first diametric section that extends to a second diametric section through a central section having a central lateral plane, the inlet being formed in the central section.

3. The turbomachine according to claim 2, wherein the extraction air cavity is positioned along the central lateral plane of the rotor inertial belt member.

4. The turbomachine according to claim 2, wherein the extraction air cavity is off-set from the central lateral plane of the rotor inertia belt member.

5. The turbomachine according to claim 1, wherein the first plurality of extraction air passages are arranged asymmetrically relative to the second plurality of extraction air passages.

6. The turbomachine according to claim 1, wherein the first plurality of extraction air passages are arranged at a first angle and the second plurality of extraction air passages are arranged at a second angle.

7. The turbomachine according to claim 6, wherein the first angle is distinct from the second angle.

8. The turbomachine according to claim 6, wherein the first angle is substantially identical to the second angle.

9. The turbomachine according to claim 1, further comprising: a passage formed in the intermediate portion of the at least one wheel member, the passage fluidly connecting the first wheel space with the second wheel space.

10. A method of extracting air from a turbomachine, the method comprising:
guiding an air flow into an extraction air cavity formed in a rotor inertia belt member of a wheel member;
passing a first portion of the air flow through a first plurality of extraction air passages formed in the rotor inertial belt member, the first plurality of extraction air passages extending between the extraction air cavity and a first wheel space; and
passing a second portion of the air flow through a second plurality of extraction air passages formed in the rotor inertial belt member, the second plurality of extraction air passages extending between the extraction air cavity and a second wheel space, wherein the first wheel space is distinct from the second wheel space.

11. The method of claim 10, further comprising:
passing the first portion of the air flow through the rotor inertial belt member at a first angle; and
passing the second portion of the air flow through the rotor inertia belt member at a second angle, the second angle being distinct from the first angle.

12. The method of claim 11, further comprising: passing the airflow into an inlet leading into the extraction air cavity, the inlet being arranged along a central lateral plane of the rotor inertial belt member.

13. The method of claim 10, further comprising: passing the airflow into an inlet leading into the extraction air cavity, the inlet being arranged off-set from a central lateral plane of the rotor inertial belt member.

14. The method of claim 10, further comprising: passing extraction air from the first wheel space through the wheel member to the second wheel space.

15. The method of claim 14, wherein, passing the extraction air through the wheel member comprises passing the extraction air through a passage formed in an intermediate portion of the wheel member.

* * * * *